Feb. 26, 1924.                                                          1,485,228
                              T. F. JOHNSON, JR
                  CROSS ARM HOOK FOR ELECTRIC TRANSMISSION LINES
                      Filed Aug. 26, 1920          2 Sheets-Sheet 2
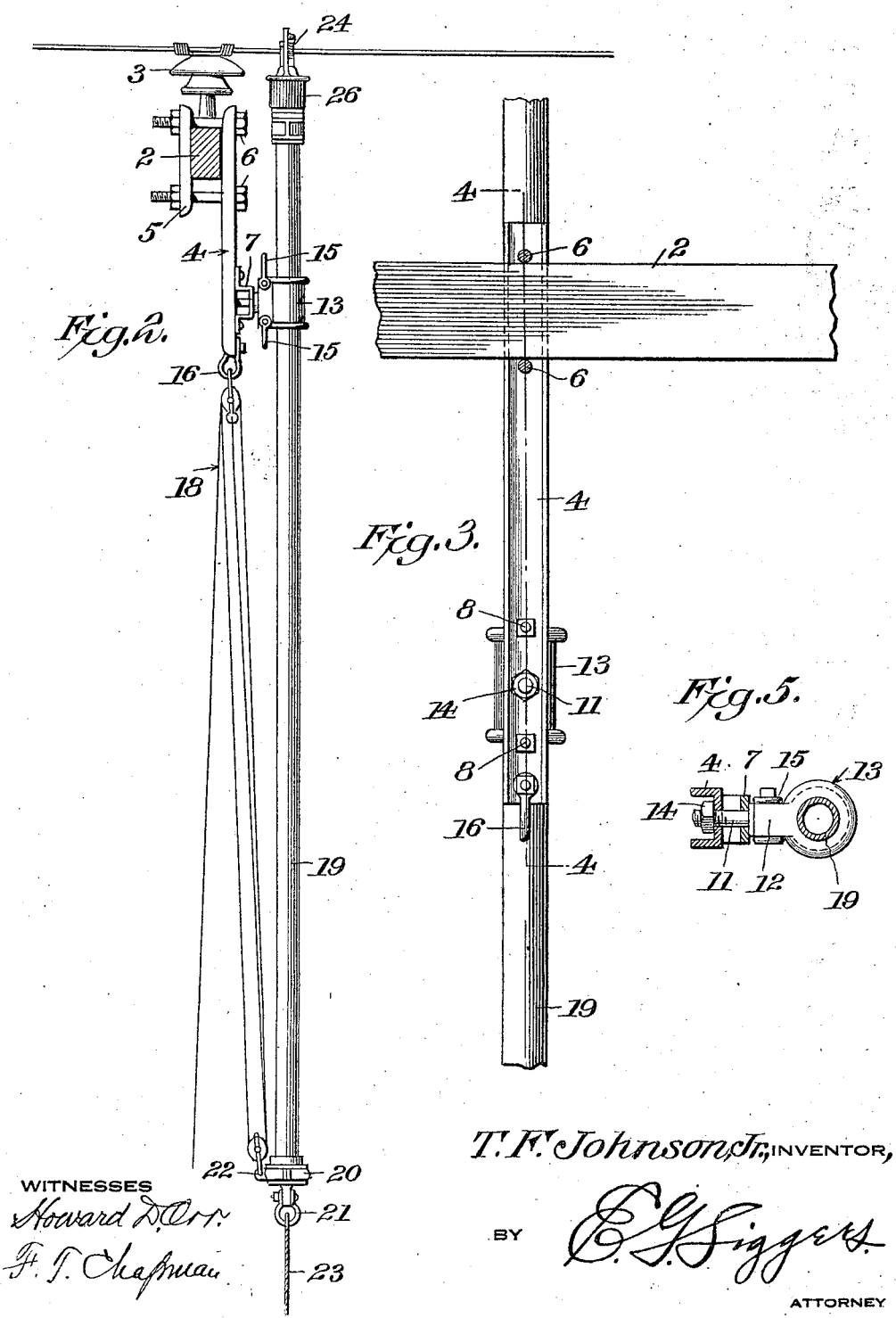

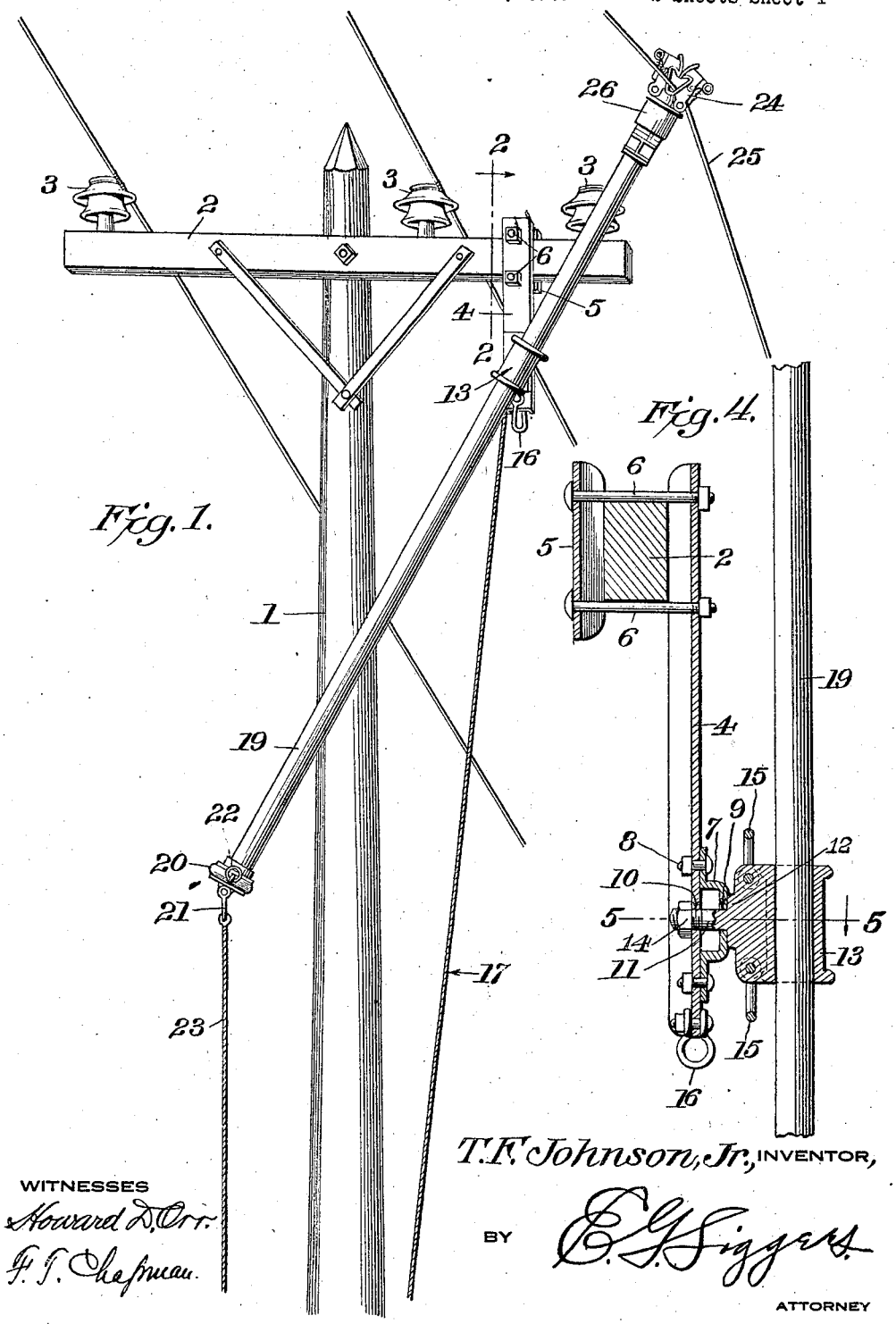

Patented Feb. 26, 1924.

1,485,228

UNITED STATES PATENT OFFICE.

TOMLINSON FORT JOHNSON, JR., OF ATLANTA, GEORGIA.

CROSS-ARM HOOK FOR ELECTRIC TRANSMISSION LINES.

Application filed August 26, 1920. Serial No. 406,209.

*To all whom it may concern:*

Be it known that I, TOMLINSON F. JOHNSON, Jr., a citizen of the United States, residing at Atlanta, in the county of Fulton and State of Georgia, have invented a new and useful Cross-Arm Hook for Electric Transmission Lines, of which the following is a specification.

This invention has reference to cross arm hooks for electric transmission lines, and its object is to provide a support in the general form of a hook, whereby an insulator changer may be applied to and carried by an ordinary permanently attached cross arm on a pole such as is employed in electric transmission lines and more particularly in high tension transmission lines permitting the removal and replacement of defective insulators without in any manner interrupting the line service, and at the same time protecting workmen from danger.

The hook comprises a clamp device readily attachable to the cross arm, and from the clamp there depends a hanger carrying at its lower end a swivel sleeve so constructed as to pass a conductor-supporting manipulating pole, permitting the sustaining of live transmission lines while a defective insulator or insulators are removed and replaced, without the necessity of touching either the live wires or the insulators in a manner to receive a shock therefrom, or of shutting off the current.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is an elevation of a transmission line pole provided with a permanent cross arm and showing the invention applied, together with the insulator changer structure carried by the device of the invention.

Fig. 2 is a section on the line 2—2 of Fig. 1 with the insulator changer in an upright position and engaging the line wire fast to an insulator on the cross arm.

Fig. 3 is an elevation on a larger scale than Fig. 2, of the cross arm, the hanger of the invention and the insulator-changer pole as viewed from the left hand side of Fig. 2 and showing certain bolts, for holding the hanger in place, in cross section.

Fig. 4 is a section on the line 4—4 of Fig. 3.

Fig. 5 is a section on the line 5—5 of Fig. 4.

Referring to the drawings there is shown in Fig. 1 a pole 1 representative of an ordinary wooden pole such as is employed in transmission lines, but which may be replaced by a concrete or other like pole or may be representative of a metal tower or other support used in the transmission of high tension electric current. Fast to the pole 1 is a cross arm 2 and this cross arm may be considered as a fixed member of whatever character. The cross arm is shown as supporting insulators 3, the specific showing being of the pin type of insulator, but it is to be understood that strings of suspension insulators may be used.

There is also provided a hanger 4, shown as a strip of channel material, such as structural steel, of sufficient length to extend from the cross arm 2 to a suitable distance there below. At the upper end of the hanger 4 there is applied a shorter channel strip 5 secured to the hanger 4 by bolts 6 above and below the cross arm 2 so that the strip 5 and upper end of the hanger 4 constitute clamp jaws held in close embracing relation to the cross arm 2 with the inturned edges of the channels engaging and biting sufficiently into the cross arm to prevent displacement, but at the same time admitting of the removal of the bolts 6 and the consequent removal of the hanger from the cross arm where such is desired.

At the lower end of the hanger 4 there is provided a spacing bracket 7 secured to the hanger by bolts 8 or in any other appropriate manner, such, for instance, as by riveting. The bracket 7 and intermediate web of the hanger 4 are provided with alined perforations 9, 10, respectively for the passage of a threaded swivel stud 11 projecting from an elongated rib 12 radial to a sleeve 13. The stud 11 at the threaded end, which is remote from the rib 12, receives a nut 14 securing the sleeve 13 to the hanger 4 after the stud has been passed through both the bracket 7 and the hanger 4, and the arrangement is such that the sleeve may be turned about the longitudinal axis of the stud 11 with the longitudinal axis of the sleeve perpendicular thereto.

At the ends of the web 12 are links 15 pivoted thereto, and at the lower end of the hanger 4 is pivot link 16, these links being provided for the purpose of securing guiding ropes or strands to manipulate the sleeve 13 and for other purposes, as may be desired. One of the manipulating ropes or strands is indicated at 17 in Fig. 1 and a suitable tackle 18 is shown in Fig. 2 as carried by the link 16 at the lower end of the hanger 4.

Traversing the sleeve 13 so as to move snugly therethrough is a pole 19 which, for the purposes of lightness, may be a tubular pole and at the lower end of the pole there is secured a head 20 with links 21, 22, to which another strand or rope 23 may be attached for guiding or manipulating purposes.

At the upper end of the pole 19 is a latch device 24 suitably constructed to engage and support a line wire 25 especially when detached from an appropriate insulator 3, so that such line wire by manipulation of the pole 19 may be lifted away from the insulator 3 and cross arm 2, permitting the workmen to remove and replace the insulator without coming in contact with the line wire. For this reason it is unnecessary to shut down the system or any part thereof while the insulators are being changed.

The pole 19 where carrying the latch 24 is provided with intervening insulation 26 so that the line wire 25, when carried by the pole 19, is amply insulated therefrom.

The sleeve 13 permits sufficient freedom of movement of the pole 19 carrying the live line wire 25 for the purposes of the invention.

In the practical use of the invention, in removing and replacing a defective insulator, the proceedings are as follows:

First, the steel hanger 4 is made fast to the cross arm approximately one foot from the insulator to be changed. The hanger should be pulled up tight enough to be certain that no slippage will occur when tightening the line. The lifting pole 19 with lifting pole pivot 11 attached, is then sent up on the pole and the pivot put in its bearing at the bottom end of the hanger and the nut 14 screwed on the end of the pivot stud. The lifting pole will now hang vertically below the hanger. The tackle should now be attached to the bottom of the hanger and the bottom of the lifting pole, also the tail line attached. Everything is now ready except untying the old tie wire. For this purpose it will be found advantageous to have two linemen on the pole; one to untie one side of the insulator and one to untie the other. The end of the tie wire on the same side of the hanger as the lifting pole is untied first. This is done by starting the end of the tie wire with the tie wire hook on the tie stick, a well known implement. If the tie wire has no end which can be easily reached with the double blade tie wire hook, one end is made by cutting the tie wire at some convenient point with a hack saw. The tie wire is then started by pulling the end of the tie wire with the points away from the pole, with the top blade of the tie wire hook. If the end of the tie wire points toward the pole, it is started by means of the bottom blade of the tie wire hook. After this has been done, the old tie wire is easily unwrapped with the head of the tie stick. If it has a long wrap, it should be cut with the hack saw as soon as the untied portion becomes difficult to handle.

With one side of the insulator untied as described above, the lifting pole 19 is raised by means of the tackle and the line conductor caught in the lifting pole head. The other side of the insulator can now be untied, and the line conductor shoved vertically and to one side by means of the lifting pole 19 far enough to allow the linemen to remove the defective insulator by hand.

The new insulator, with the tie wire attached, is now screwed into position on the pin, and the line conductor lowered back into its position on the insulator by means of the lifting pole 19 and held there. The conductor can now be tied on the side away from the lifting pole head, then the lifting pole head released, and the lifting pole lowered and the job of tying the insulator can be completed on the side of the insulator which, until now, was occupied by the lifting pole.

What is claimed is:

1. Means for use in electric transmission lines, comprising a hanger, a clamp at one end of the hanger having means for securing it fast to a cross arm in depending relation thereto and away from the line pole, and a swivel sleeve at the other end of the hanger carrying a manipulating pole for a line wire.

2. Means for use in electric transmission lines, comprising a hanger provided at one end with clamping means for securing the hanger fast to a cross arm in depending relation thereto and away from the line pole, a swivel sleeve carried by the other end of the hanger, said sleeve receiving a pole extending lengthwise through the sleeve, said pole having line engaging means at one end, and the pole and sleeve having directing means, whereby the pole carried by the sleeve may be controlled from a distance.

3. Means for use in electric transmission lines, comprising a hanger with clamping means at one end for securing said means to a cross arm, and a swivel sleeve at the other end of the hanger adapted to receive a pole for grasping and sustaining a line wire.

4. Means for use in electric transmission lines, comprising a hanger with clamping means at one end for securing said means to a cross arm, and a swivel sleeve at the other end of the hanger adapted to receive a pole for grasping and sustaining a line wire, the lower end of the hanger and the sleeve having links thereon for the attachment of means for manipulating the pole from a distance.

5. Means for use in electric transmission lines, comprising a cross arm hook consisting of an elongated channel hanger, a channel jaw at one end of the hanger, with the webs of the channels directed toward each other for engagement with opposite faces of a cross arm, means for drawing the hanger and jaw toward each other to grip the cross arm, said cross arm hook depending from the cross arm in spaced relation to the pole, a sleeve swiveled to the other end of the hanger with the passage through the sleeve perpendicular to the axis of the swivel, a link at the end of the hanger remote from the clamp, other links attached to the sleeve, said sleeve receiving a manipulating pole for engaging and carrying a line wire with the carrying means insulated from the body of the pole, and manipulating means for attachment to the pole and to the links on the sleeve and hanger, whereby to control the pole and parts carried thereby from a distance.

6. Means for use in electric transmission lines, comprising a hanger, clamping means at the upper end of the hanger for rigidly but detachably securing it to a cross arm, the hanger being maintained in a fixed position in depending relation to the cross arm, and means on the lower end of the hanger for movably connecting a manipulating pole thereto so as to permit it to move in different directions, said pole having means for engaging a line wire.

7. Means for use in electric transmission lines, comprising an elongated channel hanger, a channel jaw at one end of the hanger, with the webs of the channels directed toward each other for engagement with opposite faces of a cross arm, means for drawing the hanger and jaw toward each other to grip the cross arm, said hanger depending from the cross arm in spaced relation to the pole, a sleeve swiveled to the other end of the hanger with the passage through the sleeve perpendicular to the axis of the swivel, said sleeve receiving a manipulating pole for engaging and carrying a line wire with the carrying means insulated from the body of the pole, said manipulating pole being connected to the swivel by being extended through the passage thereof.

In testimony that I claim the foregoing as my own, I have hereto affixed my signature.

TOMLINSON FORT JOHNSON, Jr.